(12) United States Patent
Nylund (10) Patent No.: US 12,357,048 B2
(45) Date of Patent: Jul. 15, 2025

(54) LAYERED PROTECTIVE STRUCTURE FOR PROTECTIVE GARMENTS AND EQUIPMENT AND AN ELASTIC LAYER

(71) Applicant: IBP-TECH OY, Savitaipale (FI)

(72) Inventor: Mauri Nylund, Savitaipale (FI)

(73) Assignee: IBP-TECH OY, Savitaipale (FI)

( * ) Notice: Subject to any disclaimer, the term of this patent is extended or adjusted under 35 U.S.C. 154(b) by 800 days.

(21) Appl. No.: 17/623,358

(22) PCT Filed: Jun. 26, 2020

(86) PCT No.: PCT/FI2020/000012
§ 371 (c)(1),
(2) Date: Dec. 28, 2021

(87) PCT Pub. No.: WO2020/260749
PCT Pub. Date: Dec. 30, 2020

(65) Prior Publication Data
US 2022/0361609 A1    Nov. 17, 2022

(30) Foreign Application Priority Data
Jun. 28, 2019  (FI) .................... FI20197098

(51) Int. Cl.
*B32B 3/24* (2006.01)
*A41D 13/015* (2006.01)
(Continued)

(52) U.S. Cl.
CPC ....... *A41D 31/285* (2019.02); *A41D 13/0156* (2013.01); *A41D 13/0158* (2013.01); *A41D 13/05* (2013.01); *A41D 31/185* (2019.02); *B32B 3/266* (2013.01); *B32B 3/30* (2013.01); *A63B 71/08* (2013.01)

(58) Field of Classification Search
CPC .............. A41D 31/285; A41D 13/0158; A63B 2071/0063; B32B 3/24
See application file for complete search history.

(56) References Cited

U.S. PATENT DOCUMENTS 5,168,576 A    12/1992  Krent et al.
6,654,960 B2 *  12/2003  Cho .................. A63B 71/1225
                                                    2/22
(Continued)

FOREIGN PATENT DOCUMENTS

EP        3130243         2/2017
WO    WO2014/143153 A1    9/2014

*Primary Examiner* — William P Watkins, III
(74) *Attorney, Agent, or Firm* — BelayIP (57) ABSTRACT

A layered protective structure for protective garments and equipment is disclosed. The layered protective structure comprises three layers. The first layer is the outermost layer, and it is the most rigid of the layers and has first layer holes that have at their edges rim structures extending inward into the protective structure. The second layer is an elastic net-like structure that is configured to fit at least partly between the rim structures. The first layer and the second layer are on top of the third layer, which is the innermost of the layers (i.e., towards the user when the protective structure is in use). The third layer is made of a softer and more flexible material than the first layer. The second layer spreads the impact forces and conveys at least part of them to the third layer.

20 Claims, 6 Drawing Sheets (51) Int. Cl.
*A41D 13/05* (2006.01)
*A41D 31/18* (2019.01)
*A41D 31/28* (2019.01)
*B32B 3/26* (2006.01)
*B32B 3/30* (2006.01)
*A63B 71/08* (2006.01)

(56) References Cited

U.S. PATENT DOCUMENTS

| | | | |
|---|---|---|---|
| 10,206,437 B2* | 2/2019 | Behrend | A41D 13/0156 |
| 2016/0029724 A1* | 2/2016 | Kamradt | A41D 31/285 |
| | | | 267/141 |
| 2016/0327113 A1* | 11/2016 | Shelley | B32B 27/20 |
| 2018/0153237 A1* | 6/2018 | Karall | A41D 13/0156 |
| 2022/0095712 A1* | 3/2022 | Nylund | A63B 71/12 |

* cited by examiner

LAYERED PROTECTIVE STRUCTURE FOR PROTECTIVE GARMENTS AND EQUIPMENT AND AN ELASTIC LAYER

CROSS REFERENCE TO RELATED APPLICATIONS

This application is a national phase application of international application PCT/FI2020/000012, filed Jun. 26, 2020 and further claims priority to Finnish patent application FI20197098, filed 28 Jun. 2019, the content of both of which is herein incorporated by reference.

BACKGROUND OF THE INVENTION

The invention relates to a layered protective structure for protective garments and equipment, comprising three layers: a first layer, a second layer and a third layer, and the protective structure is configured to be positioned in a garment or equipment in such a way that the third layer is the nearest layer to the user of the garment or equipment and the first layer is the farthest layer from the user, and the first layer comprises a first surface, a second surface and a mesh structure having a multitude of first layer holes extending from the first surface to the second surface. The invention relates also to an elastic layer for a layered protective structure, of which the layered protective structure further comprises at least a first layer, and the first layer has a first surface and a second surface and the layered protective structure is configured in such a way that the second surface is towards the elastic layer.

Many sporting and safety garments and related equipment feature protective structures. Protective structures are present e.g., in ice hockey leg shields, breast and shoulder shields and in pants and safety garments that protect users from falls and high impacts. The protective structures are fairly stiff structures that are usually made of a plastic material, the purpose of the protective structures being receiving shocks and distributing the energy of the shock over a wider area.

Protective structures for protective garments and equipment have traditionally been made of a sheet-like material by die-cutting and forming the die-cut piece to a desired shape by subjecting it to heat. Also, the sheet-like material is bent during die-cutting in order to improve the stiffness of the piece. Also, openings have been made in the piece during die-cutting in order to lighten the piece. Plastic has normally been the material of choice. Such protective structures have been used in the outer surface of sporting equipment, e.g., in ice hockey leg shields or inside the sporting equipment, wedged between softer protective structures such as foamed plastics. The purpose of the protective structure is to receive shocks and impacts from the outside and to distribute their energy over a wider area.

A protective structure made of a sheet-like material by die-cutting inevitably becomes fairly heavy. The thickness of the material is the same throughout the whole piece and the ability of the piece to distribute shocks effectively over a wider area remains rather limited. The described protective structure also traps heat and prevents air from circulating under the protective structure, causing discomfort and fatigue.

The following publications address some of these problems.

Patent publication FI103862 shows a protective pad for a garment equipped with separate protective pads that are inserted into pockets. Each protective pad is composed of a flexible cellular protective pad material, which retains its shape and comprises interconnected walls which extend from an outer surface to an inner surface of the protective pad, said walls having a width in the direction of the surface of the pad which is smaller than the height of the wall in the thickness direction of the protective pad. The walls form cells with a closed periphery such that between the walls of the cells there remain holes extending through the pad. The pad is made from a sheet-like cellular material by cutting the material into a shape having the appropriate contour. The width of the walls increases from the outer surface towards the inner surface of the pad. The pad can be manufactured e.g., by injection moulding or by producing a cellular sheet, where cells needed for the pad are on a big sheet. The height of the walls, i.e., the thickness of the pad, is the same over the whole area of the pad.

Patent publication FI124192 shows a protective structure comprising at least in one direction a curved support rib structure of a material that is suited for injection moulding. The thickness of the support rib structure varies in a direction perpendicular to a surface formed by the support rib structure so that the thickness is greater at the middle of the support rib structure compared to the material thickness at the edges of the support rib structure. This kind of structure improves impact energy distribution and makes the whole structure lighter.

There are protective structures comprising several distinct layers. Patent publication US20090276943 discloses a protective structure having three layers. One layer has interlocking impact parts which mechanically engage each other to define the impact layer. An impact applied to any one or more of the individual impact parts is distributed to adjacent impact parts to distribute the forces of the impact over a relatively large surface area of the impact dispersion system. This also minimize the restriction of movement of the body. Further, this kind of construct may increase the weight of the protective structure and prevent air circulation. However, there is a clear need for improving protective structures for protective garments and equipment. It would be especially beneficial if the weight could be reduced and air circulation in the protective structure could be improved while retaining good impact distribution characteristics. If these goals can be achieved, there can also be other uses for the protective structures, in addition to sporting equipment. Also, there is a possibility of the protective structure of some parts of it breaking or shattering of the when the protective structure is subjected to a sufficiently forceful impact.

BRIEF SUMMARY OF THE INVENTION

An object of the invention is a solution that can significantly reduce the disadvantages and drawbacks of the prior art. In particular, an object of the invention is a solution where a is provided a light protective structure with improved air circulation and impact reduction properties.

The invention is directed to a layered protective structure for protective garments and equipment. The layered protective structure comprises three layers. The first layer is the outermost layer, and it is the most rigid one of the layers and has first layer holes which have at their edges rim structures extending inward on the protective structure. The second layer is an elastic net-like structure which is configured to fit at least partly between the rim structures. The first layer and the second layer are on the third layer which is the innermost one of the layers (i.e., towards the user when the protective structure is in use). The third layer is made of a softer and more flexible material than the first layer. The second layer spreads the impact forces and conveys at least part of them to the third layer.

If it is mentioned that some part of the layered protective structure is higher than some other part of the layered protective structure, then a situation where the layered protective structure is laying on a surface with the third layer down is described. Also, when some direction or surface or part is referred to by 'outer', it is meant that it is away from the user when the layered protective structure is in use. In one embodiment of the invention is a layered protective structure for protective garments and equipment, comprising three layers: a first layer, a second layer and a third layer. The protective structure is configured to be positioned in a garment or equipment in such a way that the third layer is the nearest of said layers to the user of the garment or equipment and the first layer is the farthest of said layers from the user. The first layer comprises a first surface of the first layer, a second surface of the first layer and a mesh structure having a multitude of first layer holes extending from the first surface of the first layer to the second surface of the first layer. In one advantageous embodiment of the invention, at least some of the edges of the first layer holes on the mesh structure have rim structures extending towards the third layer from the mesh structure. Between the rim structures is a free space comprising passages and enlarged areas. The second layer is a grid-like structure having a multitude of second layer bulges and threads between adjacent second layer bulges, and the second layer is configured to fit at least partly inside the free space between the rim structures and the second layer is more elastic than the first layer. The third layer is configured to hold the second layer and ensure a good anatomical fit for the protective structure. By the term 'good anatomical fit' it is meant here that the third layer is made of such a material that it follows the contours of the body part which the protective structure is intended to protect or the bottom (the surface that is towards the user) of the third layer is shaped to follow the contours of the body part or both. The structure and the shape of the second layer ensure that the protective structure has elastic properties but is nevertheless lighter than conventional structures.

In one embodiment of the layered protective structure, the third layer has a multitude of third layer holes, and the third layer holes are positioned in such a way that at least some of the third layer holes correspond with the first layer holes in such a way that there are holes extending through the protective structure. This feature ensures that the air circulation is efficient.

In a second embodiment of the layered protective structure, the material of the second layer comprises at least polyurethane. This has been found to be quite an effective material for achieving a sufficient degree of elasticity in the second layer.

In a third embodiment of the layered protective structure, the second layer comprises at least polyurethane elastomer units. This feature gives the second layer elastomeric properties, improving impact durability. In a fourth embodiment of the layered protective structure, the second layer further comprises polystyrene micro sphere units. The use of these materials makes it possible to have a combination of materials in the second layer which absorbs and distributes sudden and forceful impacts very quickly by changing its stiffness on a molecular response level. This means that the second layer stiffens when an impact force exceeds some limit. This feature allows better impact force distribution and at the same time it protects the first layer by spreading impact forces efficiently to the third layer.

In a fifth embodiment of the layered protective structure, the rim structure has a top side, an inner side and an outer side, and the top sides of the rim structures form at least part of the second surface of the first layer, and the heights of the rim structures are greater in the middle of the mesh structure compared to the heights of the rim structures at the edge of the mesh structure. This feature increases the strength and durability of the first layer. Also, it enhances the impact force spreading properties.

In a sixth embodiment of the layered protective structure, the first layer holes are circular or elliptical or at least partly circular or elliptical. Circular shapes are more durable, and they spread the impact forces efficiently.

In a seventh embodiment of the layered protective structure, the center points of three adjacent holes form an equilateral triangle, the sides of which differ from each other in length by 20% at most. This kind of placement of the holes yields a durable and light mesh structure. In an eighth embodiment of the layered protective structure, at least some of the enlarged areas are between three adjacent first layer holes.

In some embodiments there is a ventilation hole opening between three adjacent holes towards the enlarged area. This hole can be used for ventilating the free space between the rim structures. Also, it has been found that they further lessen the stress forces. Furthermore, they reduce the total mass of the protective structure. Also, in some embodiments, some parts of the second layer bulge can be fit into the ventilation hole.

In a ninth embodiment of the protective structure, the second layer bulges are spherical.

In a tenth embodiment of the layered protective structure, the second layer bulges are cylindrical.

In an eleventh embodiment of the layered protective structure, the second layer bulges extend away from the first layer. This feature can be used for conveying impact forces into the third layer i.e., to increase the volume of the third layer that receives the impact forces.

In a twelfth embodiment of the layered protective structure, at least some of the second layer bulges are hollow. This feature can be used to adjust the spread of the impact force to the second layer.

In a thirteenth embodiment of the layered protective structure, the third layer has a multitude of shapes, for example holes or sockets, to accept at least parts of the second layer bulges. This feature improves both impact force distribution and minimization of the lateral movements of the protective structures.

In a fourteenth embodiment of the layered protective structure, the third layer has a multitude of shapes, for example grooves, to accept at least parts of the rim structures or the second layer parts or both. This feature serves to improve the integrity of the first layer and the third layer, thus spreading the impact force efficiently.

In a fifteenth embodiment of the layered protective structure, the first layer is made of a material or a composite material that is suitable for injection moulding.

In a sixteenth embodiment of the layered protective structure, the first layer is coated at least partly with a material containing metallic particles. In some embodiments the metallic part is made of metallic material having a fine-grained microstructure with an average grain size of between 2 and 5,000 nm. This feature improves the impact resistance of the first layer and therefore, of the whole protective structure.

In a seventeenth embodiment of the layered protective structure, the open surface area of the mesh structure, i.e. the total area of the holes, is at least 60% or more of the total area of the mesh structure in its entirety. This makes the protective structure light and at the same time durable.

In an eighteenth embodiment of the layered protective structure, the diameters of the first layer holes that are situated wholly inside the mesh structure are between 2 and 7 cm. Bigger holes do not provide any more protection from direct hits and using smaller holes increases the mass of the protective structure and impairs air circulation.

In a nineteenth embodiment of the layered protective structure, the second layer includes sensors and connectors to external devices. In a twentieth embodiment of the layered protective structure, the second layer has at least one second layer hole and at least some of the second layer threads form at least one circle around the second layer hole. This feature makes the structure of the second layer more durable, and it allows lateral distribution of the impact forces.

In a twenty-first embodiment of the layered protective structure, the third layer is foam plastic or contains at least partly foam plastic. This feature improves the properties of the third layer for cushioning impacts and fitting the layered protective structure snugly against the body of the user.

In one embodiment of the invention is an elastic layer for a layered protective structure for protective garments and equipment, and the layered protective structure further comprises at least a first layer, and the first layer has a first surface of the first layer and a second surface of the first layer and the layered protective structure is configured in such a way that the second surface of the first layer is towards the elastic layer. In one advantageous embodiment of the invention, the elastic layer is a grid-like structure having a multitude of bulges and threads between adjacent bulges, and the second surface of the first layer has shapes which form a free space that comprises passages and enlarged areas, and the elastic layer is configured to fit at least partly into the free space.

It is an advantage of the invention that it provides a layered protective structure that is light and has efficient air circulation. The invention also allows the use of heavy elastic materials which usually cannot be used or have only limited use due their weight.

Using the layered protective structure significantly improves impact-spreading and thus diminishes the probability of injuries. It also makes for a product that has no complex parts, so that it is easier to manufacture and maintain than devices according to known techniques.

One advantage of the invention is that it is quite durable and retains its form but is still elastic. The layered protective structure can also be easily and quickly integrated in different kinds of garments and equipment. It also allows an embodiment where the second layer is elastic when subjected to light impacts and the second layer stiffens when subjected to a sufficiently forceful impact. This makes it possible to construct protective structures that can withstand and protect the user from more powerful impacts than known techniques. This feature guides air circulation and improves the impact durability of the layered protective structure. It also prevents the first layer from breaking or shattering.

It is a further advantage of the invention that additional devices, such as sensors, can be easily integrated in the layered protective structure. Also, the invention makes it possible, due its lightness and efficient air circulation, to use the layered protective structure in, for example, safety garments for elderly people.

BRIEF DESCRIPTION OF THE DRAWINGS

Further advantages features and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure.

In the following, the invention is described in detail. The description refers to the accompanying drawings, in which.

DETAILED DESCRIPTIONS OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C" then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination.

The embodiments in the following description are given as examples only and someone skilled in the art can carry out the basic idea of the invention also in some other way than what is described in the description. Though the description may refer to a certain embodiment or embodiments in several places, this does not mean that the reference would be directed towards only one described embodiment or that the described characteristic would be usable only in one described embodiment. The individual characteristics of two or more embodiments may be combined and new embodiments of the invention may thus be provided.

Figure 1:
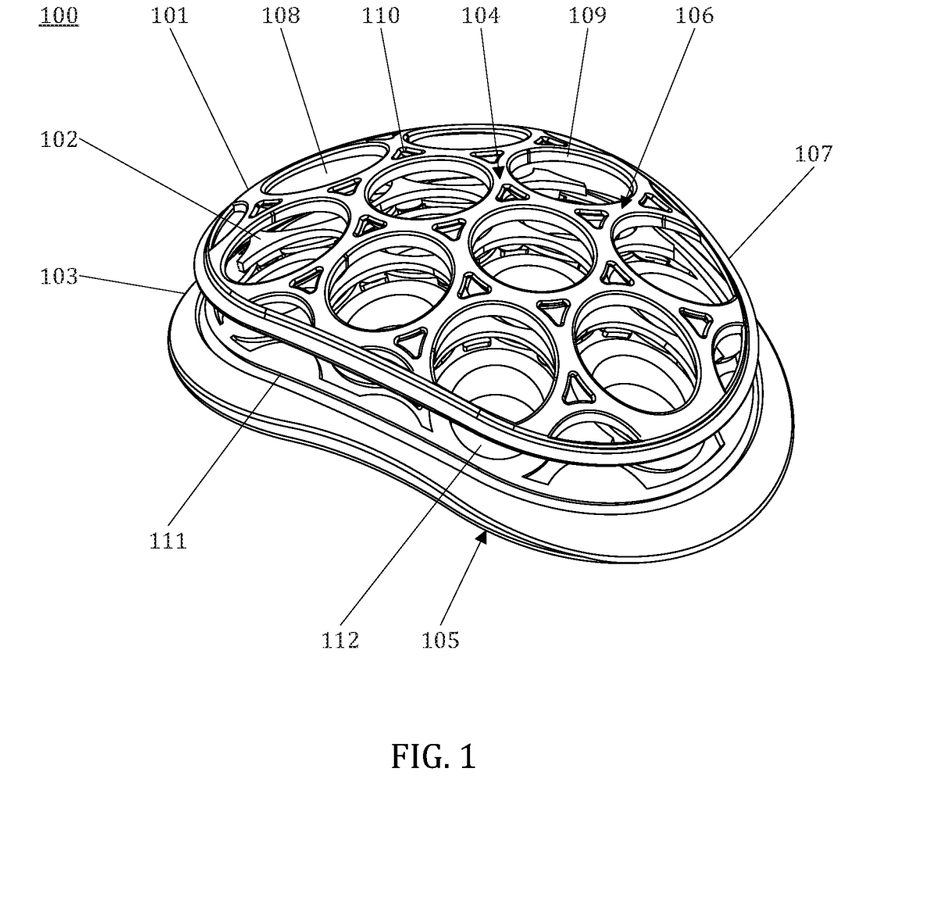
FIG. 1 depicts an example of a layered protective structure according to an embodiment.

FIG. 1 shows an embodiment of a layered protective structure 100. The protective structure is a plate-like construct having a first surface 104 and a second surface 105 comprising at least three layers: a first layer 101, a second layer 102 and a third layer 103. The protective structure is configured in such a way that when the protective structure is in use, i.e., it is installed in a garment or equipment and the user is wearing it, the second surface is towards the user. The protective structure is curved in a such way that the body part to be protected is partly surrounded or covered by the protective structure. The protective structure can curve in many different directions. The protective structure could, for example, take the form of a hemi sphere, a half ellipse, or any combination of these. Choosing the correct curvature depends on where the protective structure is to be placed and how the impact forces are to be distributed. In the FIG. 1 the layers are separated from each other for making the features of the protective structure clearer.

The first layer 101 comprises a mesh structure 106 and a border frame 107. The mesh structure has a multitude of first layer holes 108 extending through the first layer. The first layer has an outer surface (a first surface of the first layer) and an inner surface (a second surface of the first layer). The outer surface forms the first surface 104 and the inner surface is towards the second surface 105 (i.e., the inner surface is closer to the second surface than the outer surface). Between the first layer holes are rib structures which function as a frame for the mesh structure 106. In some embodiments the border frame surrounds the mesh structure at least partly. In this embodiment the border frame is a flat shelf. The border frame serves to support the mesh structure and in some embodiments, it also serves as a platform for fixing the first layer. Also, in some embodiments the border frame can be used for attaching cushioning. Some supporting fabric layers can be fixed to the border frame, too. The first layer holes on the mesh structure have some kind of geometrical shape. In this embodiment the first layer holes 108 are circular or elliptical or partly circular or elliptical. Of course, in some embodiments they can be rectangular or take some other form. It must be noted that shapes of the first layer holes can vary in different parts of the mesh structure 106. The border frame delimits the mesh structure in such a way that some of the first layer holes 108 are whole and some first layer holes are incomplete, i.e., they are truncated. In some embodiments the thickness of the border frame is less than the distance between the outer surface and the inner surface at the edge of the mesh structure.

The edges of the first layer holes 108 on the mesh structure 106 on the inner surface have rim structures 109 extending towards the second surface 105 from the mesh structure, i.e., the rim structures are towards the user when the protective structure 100 is in use. The rim structure is a wall-like construct and has a top side, an inner side, and an outer side. Between the rim structures is a free space which can be used, for example, for guiding air currents in the horizontal direction in relation to the protective structure, i.e., inside the protective structure. The height of the rim structure is the distance from the outer surface (i.e., the first surface 104) to the top side of the rim structure. The inner side of the rim structure is towards the first layer hole 108 that the rim structure is surrounding. The top sides of the rim structures form at least part of the inner surface, i.e., the thickness of the first layer is the vertical distance from the outer surface to the top side of the rim structure. It must be noted that the inner surface of the first layer is partly virtual, i.e., there is no continuous material surface that would form the inner surface. The top parts of the rim structures define the inner surface of the first layer. In some embodiments the heights of the rim structures are greater at the middle of the mesh structure compared to the heights of the rim structures at the edge of the mesh structure. This means that the thickness of the first layer 101 is greater at the middle of the mesh structure compared to the thickness of the first layer at the edge of the mesh structure. The outer surface and the inner surface have curvature radiuses. In some embodiments one of the curvature radiuses of the inner surface is greater than the corresponding curvature radiuses of the outer surface. The term 'corresponding' means here that they are on top of each other and have the same direction. The width of the rim structure (i.e., the distance between the outer surface and the inner surface of the rim structure) is significantly smaller than the diameter of the first layer hole which the rim structure surrounds.

In some embodiments the rim structures 109 are separate from each other. The mesh structure frame (rib structure) between the first layer holes 108 can be interpreted as a beam having a U-shaped groove. The walls of the groove are rim structures of the two adjacent first layer holes and the bottom of the groove is the rib structure between the two same adjacent first layer holes.

The rim structures 109 are continuous at the first layer holes 108 that do not touch the border frame 107, i.e., the rim structure completely surrounds the first layer hole. The first layer holes that are delimited by the border frame may have rim structures that end at the point where the edge of the first layer hole meets the border frame.

When the first layer 101 is manufactured by injection moulding the usage of raw material can be minimized compared to a protective structure manufactured by die cutting. There is always a rather big wastage when pieces of a desired size and form are die-cut from a uniform sheet with the die-cut technique. Injection moulding makes it is also possible to optimize the thickness of the mesh structure 106 so that sufficient stiffness and strength are achieved with a minimum of material. Injection moulding makes elaborate designs possible and thus the whole protective structure can be shaped in the desired way or at least its first layer. Therefore, the mesh structure can be as aesthetical pleasing as desired. Suitable materials for injection moulding are many plastic materials as well as plastic materials that are reinforced, for example carbon fiber. The material must naturally be of such a variety that it attains sufficient hardness after curing. The first layer can be manufactured from a plastic grade or a composite of a plastic and a reinforcing material that are best suited for each application. To increase the hardness of the first layer, the mesh structure and the border frame can be coated with a material containing metallic particles. This prevents cracks and fracture formation. Thus, lighter and softer materials can be used. The best results are achieved when the metallic particles are metallic material having a microstructure which is fine-grained with an average grain size between 2 and 5 000 nm. The coating improves the properties of the first layer and thus the whole protective structure 100, allowing it to be made lighter.

In the embodiment described in the FIG. 1 the first layer holes 108 are positioned on the mesh structure 106 in such a way that they are interleaved to cover as much area as possible and still keep the frame of the mesh structure solid, i.e., the rib structures between the first layer holes should not become too narrow. In some embodiments the center points of three adjacent first layer holes form an equilateral triangle or a triangle, the sides of which differ from each other in length by 20% at most. The length of the sides may vary because of the shapes of the first layer holes and the geometry (curvature) of the mesh structure.

In some embodiments there is a ventilation hole 110 between three adjacent first layer holes opening to the free space between the rim structures 109. Of course, there can be other embodiments in which the ventilation holes are positioned differently, in case the first layer holes are placed in some other formation. For example, the centers of the first layer holes may form an equidistant grid and the ventilation holes may be at the middle points of the squares formed by four adjacent first layer holes. Of course, there can be ventilation holes in other places as well. For example, in the embodiment of the FIG. 1 there are also some ventilation holes near the border frame 107. The ventilation holes are for lightening the whole protective structure 100 and for guiding air currents inside the free space. Also, they can be configured to receive some parts of the second layer 102.

The mesh structure 106 forms a cell-like structure having a large open surface. The large open surface contributes to making the first layer 101 light-weight. In some embodiments the rib structures 109 can be dimensioned so that the width of the rib structures in the direction of the surface of the support structure is smaller than the height of the rim structure 109. By varying the height of the rim structures, it is possible to regulate the stiffness of the first layer in the direction perpendicular to the surface of the protective structure 100. On the other hand, the rib structure can be kept narrow in the direction of the surface of the protective structure in order to achieve a large open area. Also, a large open area makes the air permeability of the protective structure especially high. In some embodiments, the open surface area of the mesh structure is at least 60% of the total area of the mesh structure. The open area comprises both the holes 108 and the ventilation holes 110. Of course, the open area may be even larger, but this is the smallest limit, and below that the first layer 101 becomes heavy and sweaty in use.

Therefore, the first layer 101 of the protective structure 100 can be made light, but still stiff enough. The stiffness of the first layer can be regulated also by changing the size of the mesh structure 106. The first layer is the most rigid layer of the protective structure.

The amount of material used in the mesh structure 106 can be optimized in relation to the stiffness by varying the thickness of the mesh structure in a direction perpendicular to the outer surface of the first layer formed by the mesh structure, so that the thickness of the material is greater at the middle of the mesh structure compared to the thickness at the edges of the mesh structure. More material can be concentrated in those parts of the mesh structure where the benefit in relation to the stiff ness is the greatest. By concentrating more material in the middle of the mesh structure the middle part of the mesh structure will become stiffer and the edges more flexible. In consequence, the middle part of the mesh structure can withstand impacts and transfer impact energy to the edges of the first layer 100 more efficiently. The more flexible edge parts of the first layer also contribute to the suitability of the protective structure in some equipment, improving user comfort. The rim structures 109 can improve this further. In some embodiments the diameters of the first layer holes 108 positioned wholly in the mesh structure 106 are between 2 and 7 cm, i.e., these constitute the first layer holes that are not delimited by the border frame 107. If the diameters are larger, i.e., the holes are bigger, the projectiles may penetrate the first layer 101 and at the same time the whole protective structure 100. These impacts may be, for example, hockey puck impacts.

The free space between the rim structures comprises passages and enlarged areas. The passages are narrow channels between two first layer holes 108 and more specifically, between adjacent rim structures. The enlarged areas are widened places where the passages meet. In this embodiment the enlarged areas are between three adjacent first layer holes. Also, in this embodiment the ventilation holes 110 open into the enlarged areas. The passages and the enlarged areas are con figured in such a way that they can receive at least some parts of the second layer 102. It must be noted that the free space is between the outer surface and the inner surface of the first layer. The free space does not extend outside of the first layer.

The second layer 102 is a grid-like structure having a multitude of second layer bulges and threads between adjacent second layer bulges. The second layer is con figured to fit at least partly inside the free space between the rim structures. The second layer bulges are configured to fit at least partly into the enlarged areas and the threads are configured to fit at least partly inside the passages. The second layer is made of elastic material. In particular, the second layer is more elastic than the first layer 101. The elasticity of the second layer enhances the impact distribution properties of the protective structure 100. Also, the elastic second layer dampens impacts. The bulge-thread structure limits lateral stretching of the second layer because the rim structures 109 of the first layer 101 hold the second layer. Thus, the second layer transformations are mainly vertical, improving the impact durability of the protective structure 100.

The elastic material for the second layer 102 can be chosen from many possible materials. In one advantageous embodiment the material is same in the whole structure of the second layer, i.e., the properties of the material are the same everywhere in the second layer. One possible material or part of a composite material composition is polyurethane.

In some embodiments the material of the second layer 102 comprises at least polyurethane elastomer units. In some embodiments the material further comprises (in addition to the polyurethane elastomer units) polystyrene microsphere units. The polyurethane elastomer material and the polystyrene microspheres unit are connected by chemical bonds.

In some embodiments the polyurethane elastomer unit is composed of a polyurethane polyisocyanate with a polyol resulting from a reaction of the cross-linked polymers. The isocyanate is one or more organic isocyanates, aliphatic, cycloaliphatic, araliphatic, aromatic isocyanate or disocyanate and the like. The polyhydric alcohol is one or more polyether polyols, polyester polyols or polycarbonate polyols like diols. In some embodiments, the polyurethane elastomer unit is based on aliphatic polyurethanes. The polyol is preferably a polyether polyol. In some embodiments of the invention, the polyurethane elastomer unit is preferably a polyether polyurethane.

In some embodiments of the invention, the polystyrene microspheres unit is based on polystyrene crustaceans-type liquid crystal cell.

Using some of combinations described above or corresponding material combinations, it is possible to find a material for the second layer that absorbs and a distributes a forceful and quick impact in molecular response level by changing its stiff ness. The material is soft and flexible before impact. Under the influence of a sufficiently forceful impact, a small molecular aggregate around a macro-molecular bubble chain joint area and interlock into a molecular chain, and the material becomes more rigid when the speed of the impact grows. The changes in the molecular movement and hardness lead to energy absorption and distribution changes. After the impact, the material reverts to its original softness and flexibility. This kind of material may lose some of its elasticity when it is subjected to an impact that exceeds some force limit. Using a material with these properties enhances impact force distribution when subjected to forceful impacts when the second layer turns rigid at least under the impact area. Also, in the rigid phase the second layer also protects the first layer 101 from shattering or breaking by supporting it when subjected to a forceful impact.

The third layer 103 has an upper side and a bottom side. The upper side of the third layer is towards the first layer 101 and the second layer 102, and the bottom side is towards the user of the protective structure 100 when the protective structure is in use. The third layer is configured to hold the second layer 102 and ensure an anatomical fit for the protective structure 100. By the term 'anatomical fit' it is meant here that the third layer is made of such a material that it follows the contours of the body part which the protective structure is intended to protect. This is achieved either by the having the third layer composed from a soft and flexible material (i.e., of a material that can be easily deformed) or by shaping the third layer, or at least the bottom side of the third layer, according to the body part. In some embodiments the third layer has a multitude of third layer holes 112. The third layer holes are positioned in such a way that at least some of the third layer holes correspond with the first layer holes 108 in such a way that there are holes extending through the protective structure 100. In some embodiments the third layer has a multitude of shapes, for example holes or sockets, for receiving at least parts of the second layer bulges. The third layer has a multitude of shapes 111, for example third layer grooves, for receiving at least parts of the rim structures 109 or the second layer 102 parts or both. Also, the third layer grooves can receive the border frame 107. In some embodiments the third layer is made of a foam plastic, or it contains at least partly foam plastic. These materials are both soft and they can be shaped, and they maintain their shape.

The protective structure 100 can be placed inside a garment or an equipment for enhancing the protective properties. The manner in which the layers of the protective structure are fastened to each other depends on the usage of the protective structure. Because the first layer is the most rigid layer of the protective structure, the first layer forms the frame of the protective structure and gives the shape of the protective structure.

Figure 2:
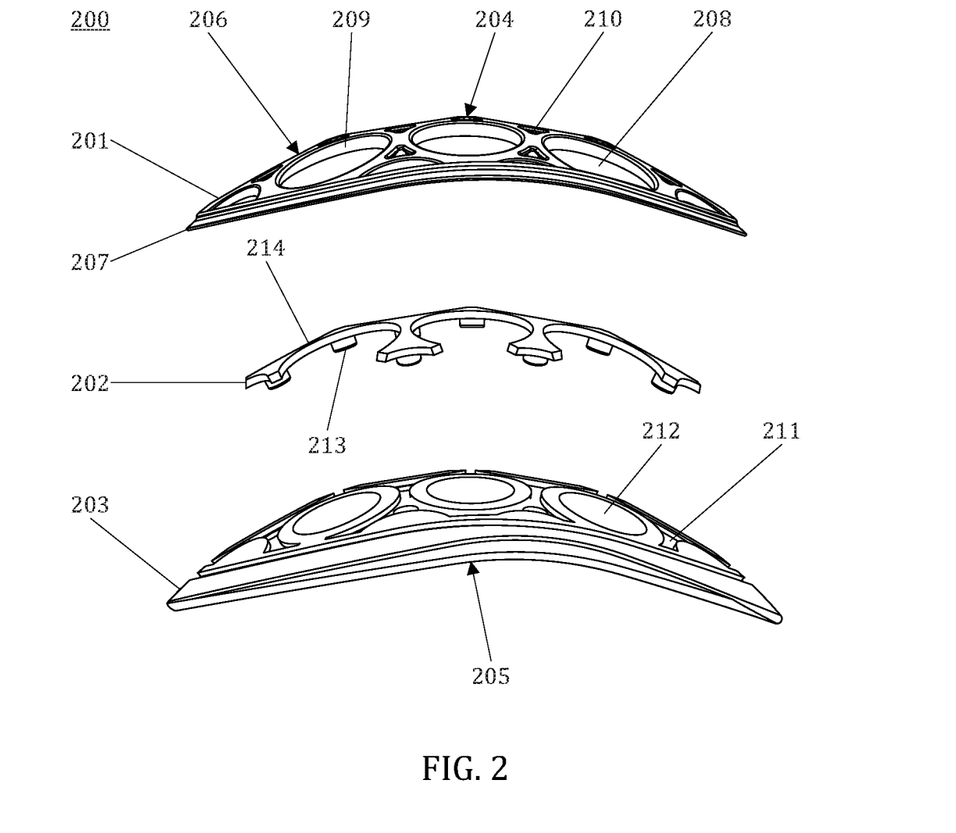
FIG. 2 depicts a second example of a layered protective structure according to an embodiment.

FIG. 2 shows a second embodiment of a protective structure 200 as seen from side. The layers are separated from each other for the sake of clarity. The protective structure has a first surface 204 and a second surface 205 and comprises at least three layers: a first layer 201, a second layer 202 and a third layer 203.

The first layer comprises a mesh structure 206 and a border frame 207. The mesh structure has a multitude of first layer holes 208 extending through the first layer. Between the holes are rib structures that form the frame of the mesh structure, and one surface of the rib structures forms the outer surface of the protective structure 200, i.e., the first surface 204. The first layer is slightly curved. The middle point, i.e., the top point of the mesh structure is located higher than the border frame (i.e., the top point is vertically farthest from the border frame plane). Even the slightly outward (i.e., the direction away from the user of the protective structure when the protective structure is in use) curvature of the mesh structure is beneficial, because a curved structure spreads impact forces more efficiently than a flat surface.

At the edges of the first layer holes are rim structures 209. Between the rim structures 209 is free space. The free space forms passages that are delimited by the rim structures. The free space comprises enlarged areas and passages. At the edges of the mesh structure 206 the border frame 207 delimits the free space. In some embodiments there may be some openings or grooves in the border frame that connect outer areas of the free space when the protective structure 200 is in use. There are ventilation holes 210 on the rib structures connecting the free space to the first surface 204. In this example the ventilation holes are situated between three adjacent first layer holes 208, the center points of which form a triangle. The ventilation holes serve to enhance air circulation. Also, they further decrease the total weight of the protective structure 200. Furthermore, careful positioning and shaping the ventilation holes allows for guiding and spreading the stress and impact forces of an impact affecting the protective structure. Also, the ventilation holes improve flexibility of the first layer and prevent shearing forces from acting on the rib structures. Also, the ventilation holes can be configured to receive some parts of the second layer.

The second layer 202 is elastic material. The second layer is grid-like or net-like flat structure, having second layer bulges 213 and threads 214. The second layer bulges are thicker than the threads. The second layer bulges form knots in the second layer and one or more elongated threads connects nearby bulges to each other. The manner in which this is implemented depends on the shapes of the free space, i.e., the positions of the enlarged areas and the passages. The second layer is con figured in such a way that the threads fit at least partly inside the corresponding passages and the second layer bulges fit at least partly inside the corresponding enlarged areas. The diameters of the second layer bulges are greater that the diameters of the threads. And, more particularly, the diameters of the second layer bulges are greater that the diameters of the passages. This means that if an impact moves the layers of the protective structure 200, the second layer bulges cannot enter into the passage. Thus, the second layer prevents lateral movements in the protective structure. In this example the surface of the second layer, which is to wards the first layer 201, is smooth and the second layer bulges extend towards the second surface 205.

Figure 3:
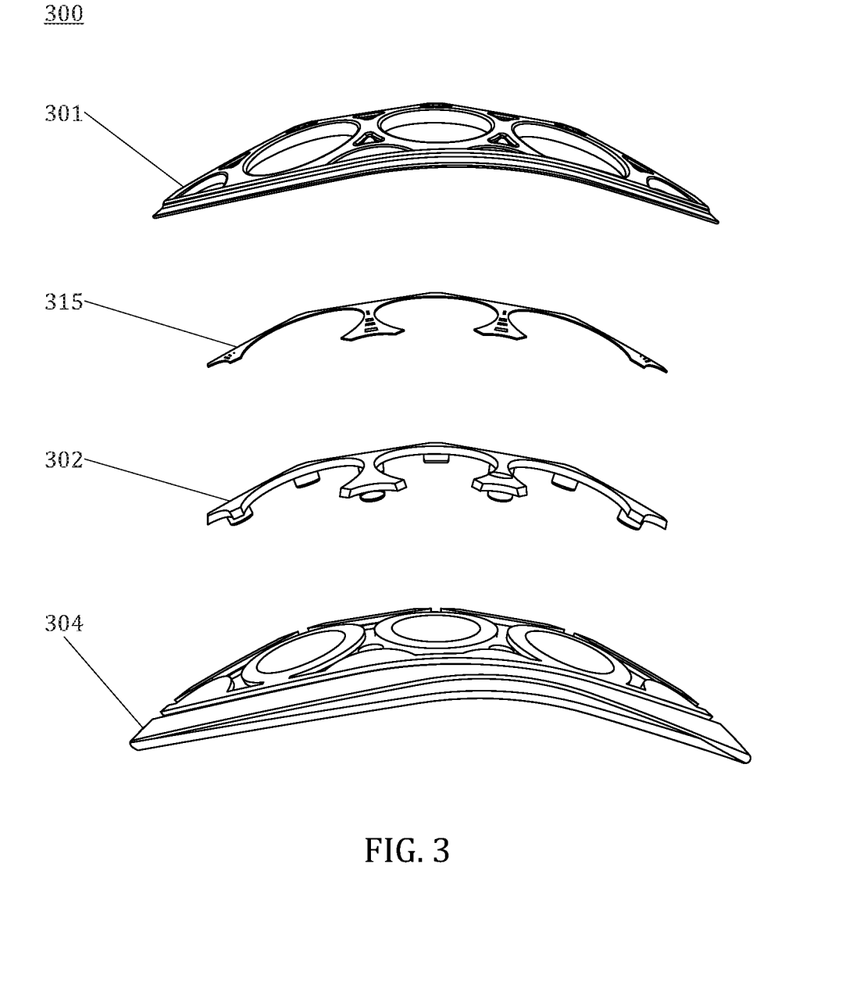
FIG. 3 depicts a third example of a layered protective structure according to an embodiment.

The third layer 203 comprises third layer holes 212 and third layer grooves 211 to receive both parts of the first layer 201 and the second layer 202. In some embodiments the first layer and the third layer are fixed to each other. The fixing can be done by, for example, knitting, stapling, gluing or a similar means, the border frame 207 to the third layer material. FIG. 3 shows a third embodiment of a protective structure 300 as seen from side. The layers are separated from each other for the sake of clarity. The protective structure comprises at least three layers: a first layer 301, a second layer 302 and a third layer 303. Between the first layer and the second layer is placed a sensor arrangement 315. The sensor arrangement includes sensors, for example acceleration sensors, and connectors to external devices. In this example the sensor arrangement is a thin flexible printed circuit board. Naturally, the sensor arrangement can be placed and implemented differently.

Figure 4:
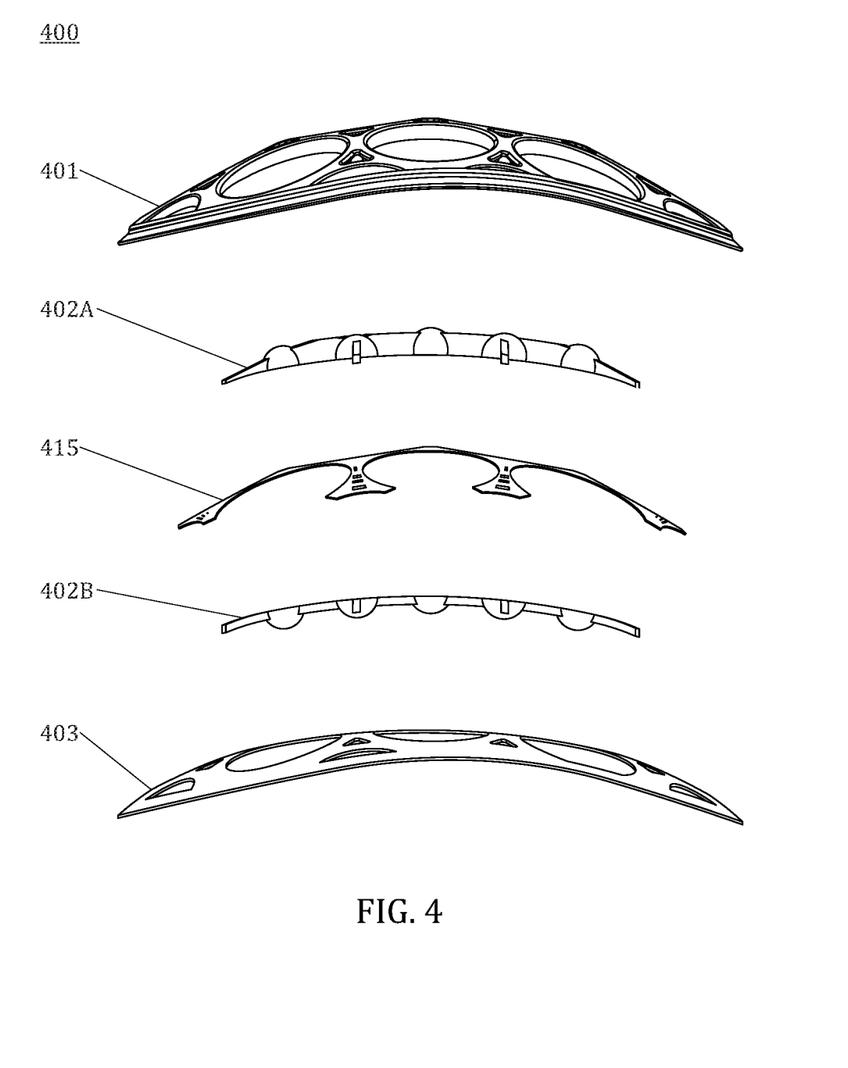
FIG. 4 depicts a fourth example of a layered protective structure according to an embodiment.

FIG. 4 shows a fourth embodiment of a protective structure 400 as seen from the side. The layers are separated from each other for the sake of clarity. The protective structure comprises at least three layers: a first layer 401, a second layer and a third layer 403. In this embodiment the second layer has two parts: a first second layer part 402a and a second second layer part 402b. The second layer parts are fixed to each other when the protective structure is manufactured. If the second layer is molded, having a two-part second layer makes it possible to implement hollow second layer bugles. In some embodiments the hollow second layer bugles share the elastic properties of the second layer. Also, it makes the second layer lighter. The protective structure further comprises a sensor arrangement 415. The sensor arrangement can be placed between the second layer parts when fixing the second layer parts together. In that way the sensor arrangement is quite well protected because the second layer stretches and compresses mainly in the vertical direction. In this embodiment the second layer bulges are spherical, and they extend to both sides of the second layer.

Figure 5:
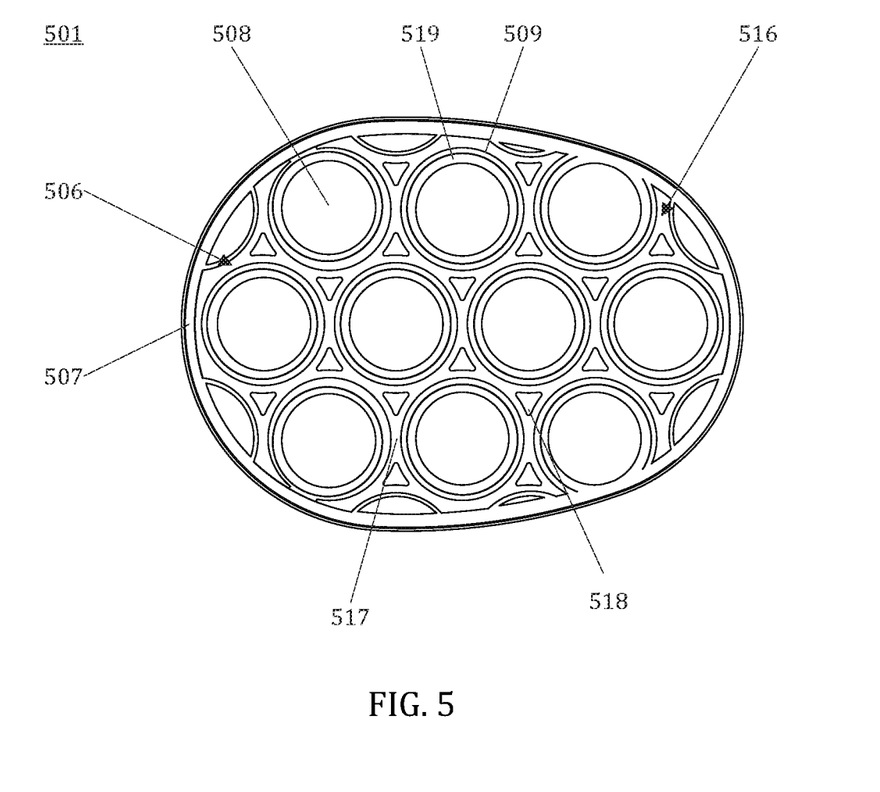
FIG. 5 depicts an example of a first layer according to an embodiment.

FIG. 5 shows an embodiment of a first layer 501 as seen from below, i.e., from the direction of the second surface of the protective structure. The first layer is a bottom surface, i.e., a surface which is towards the second surface and towards the user when the protective structure is in use, and an upper surface on the opposite side of the first layer. The first layer comprises a mesh structure 506 and a border frame 507. The mesh structure has a multitude of first layer holes 508 extending through the first layer. The first layer holes are surrounded by rim structures 509. The rim structures are wall-like structures, and they extend towards the second surface of the protective structure. The rim structures have inner walls that are towards the center of the first layer hole, the outer wall, and the top side. The top sides of the rim structures form at least part of the bottom surface. It must be noted that the bottom surface is partly virtual, i.e., there is no continuous material surface that would form the bottom surface. Between the rim structures 509 is a free space 516. The free space forms passages 517 and enlarged areas 518 that are delimited by the rim structures (the outer walls of the rim structures). At the edges of the mesh structure 506 the border frame 507 delimits the free space. In some embodiments there may be some openings or grooves in the border frame that connect outer areas of the free space when the protective structure is in use.

In this embodiment there is a collar structure 519 on the inner wall of the rim structure. The collar structure has a first collar surface and a second collar surface that are approximately parallel to the surfaces of the first layer near the collar structure. In addition, the collar structure has a side surface that is parallel to the inner wall of the rim structure. The side surface defines the height of the collar structure. The height of the collar structure is less than the height of the rim structure. In some cases, the collar structures may serve to increase the stiffness of the outer surface of the first layer (i.e., the first surface of the protective structure). Also, the collar structures can serve to prevent the soft third layer material from bulging out of the first layer hole. In some embodiments the collar structure is positioned in such a way that the first collar surface is part of the first surface, i.e., the upper surface of the first layer. This means that the diameter of the first layer hole 508 on the upper surface is less than the diameter of the first layer hole on the bottom surface. In that case the collar structures do not form any steps on the upper surface. Naturally, there are embodiments where the collar structures are positioned differently.

The mesh structure 506 effectively transfers the energy of an impact to the mesh structure from the rigid crossing points of the mesh structure parts into every direction of the protective structure. The mesh structure can also be designed so that some projectile hitting the mesh structure transfers impact energy through the mesh structure into the layers underneath the mesh structure. This can be, for example, a third layer comprising a plastic foam structure or some such. The mesh structure and especially the rim structures will thus protrude a certain distance into the third layer cushioning whereas the energy of the impact is absorbed into the plastic foam structure. Also, the second layer further disperses and dampens the impact energy.

Figure 6A:
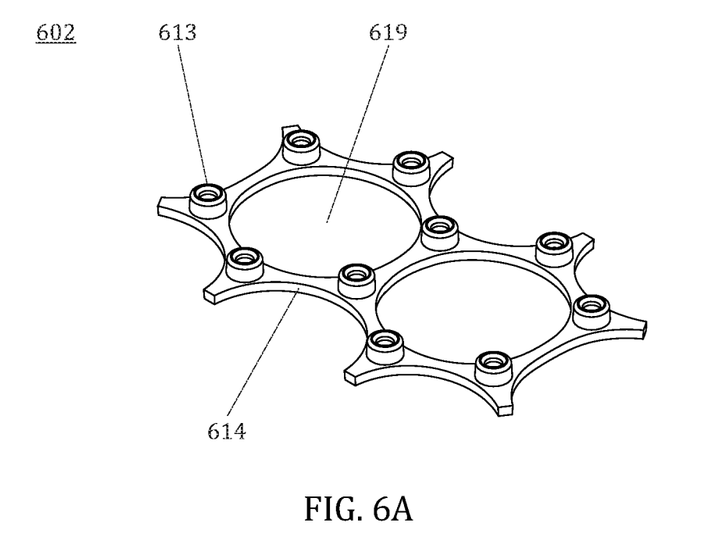
FIG. 6a depicts an example of a second layer according to an embodiment.
Figure 6B:
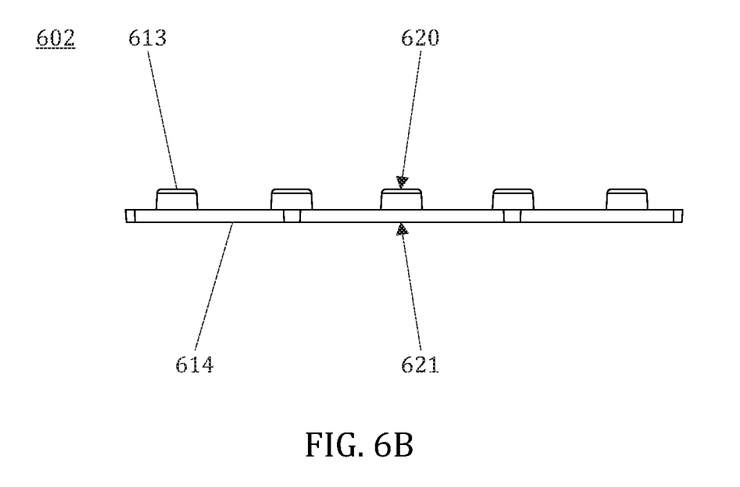
FIG. 6b depicts the second layer of FIG. 6a as seen from the side.

FIG. 6a shows an embodiment of a second layer 602. FIG. 6b shows the second layer as seen from side.

The second layer 602 has a second layer upper surface 620 and a second layer bottom surface 621. The second layer upper surface is towards the first layer when the second layer is inside the protective structure. The second layer bottom surface is towards the third layer when the second layer is in the protective structure.

The second layer 602 comprises a multitude of second layer bulges 613 and threads 614. These form a grid-like structure. In this embodiment there is a second layer hole 619. Six threads form together a circle, and the second layer hole is in the middle of this circle. In this embodiment the second layer bulges are hollow cylinders extending from the second layer upper surface 620. When the second layer is inside the protective structure, the second layer bulges fit inside the enlarged areas in the first layer. In some embodiments the first layer has ventilation holes, and the second layer bulges can partly fit inside them too. In that case the upper parts of the second layer bulges can be shaped accordingly. In some embodiments the second layer bulges extend to both surfaces of the second layer.

The structure and the shape of the second layer 602 depends on how the first layer is constructed and more particularly, on how the first layer holes and rim structures are positioned.

Some advantageous embodiments of the device according to the invention have been described above. The invention is however not limited to the embodiments described above, but the inventive idea can be applied in numerous ways within the scope of the claims.

The invention claimed is:

1. A layered protective structure for protective garments and equipment, comprising:
    a first layer,
    a second layer,
    a third layer, and
    wherein the protective structure is configured to be positioned in a garment or equipment in such a way that the third layer is the nearest of the first layer, the second layer and the third layer to the user of the garment or equipment and the first layer is the farthest of said the first layer, the second layer and the third layer from the user,
    wherein the first layer comprises a first surface of the first layer, a second surface of the first layer and a mesh structure having a multitude of first layer holes extending from the first surface of the first layer to the second surface of the first layer,
    wherein at least some of the edges of the first layer holes on the mesh structure have rim structures extending towards the third layer from the mesh structure, and between the rim structures is a free space comprising passages and enlarged areas,
    wherein the second layer comprises a grid-like structure having a multitude of second layer bulges and threads arranged between adjacent second layer bulges, and the second layer is configured to fit at least partly inside the free space between the rim structures, and the second layer is more elastic than the first layer, and
    wherein the third layer is configured to hold the second layer and ensure an anatomical fit for the protective structure.

2. The layered protective structure according to claim 1, wherein the third layer comprises a multitude of third layer holes arranged such that at least some of the third layer holes correspond with the first layer holes such that there are holes extending through the protective structure.

3. The layered protective structure according to claim 1, wherein the second layer comprises polyurethane.

4. The layered protective structure according to claim 1, wherein the second layer comprises polyurethane elastomer units.

5. The layered protective structure according to claim 4, wherein the second layer further comprises polystyrene microsphere units.

6. The layered protective structure according to claim 1, wherein the rim structure comprises a top side, an inner side and an outer side, and the top sides of the rim structures form at least part of the second surface of the first layer, and the heights of the rim structures are greater in the middle of the mesh structure as compared to the heights of the rim structures at the edge of the mesh structure.

7. The layered protective structure according to claim 1, wherein the first layer holes are circular or elliptical or at least partly circular or elliptical.

8. The layered protective structure according to claim 7, wherein the center points of three adjacent first layer holes form an equilateral triangle or a triangle, the sides of which differ from each other in length by up to 20%.

9. The layered protective structure according to claim 8, wherein at least some of the enlarged areas are arranged between three adjacent first layer holes.

10. The layered protective structure according to claim 1, wherein the second layer bulges are at least one of spherical, cylindrical and hollow.

11. The layered protective structure according to claim 1, wherein the second layer bulges are arranged and configured to extend away from the first layer.

12. The layered protective structure according to claim 1, wherein the third layer comprises holes or sockets configured to receive at least parts of the second layer bulges.

13. The layered protective structure according to claim 1, wherein the third layer comprises grooves configured to receive at least one of parts of the rim structures and the second layer parts.

14. The layered protective structure (according to claim 1, wherein the first layer comprises a material or composite material configured for injection moulding.

15. The layered protective structure according to claim 1, wherein the first layer is coated at least partly with a material containing metallic particles.

16. The layered protective structure according to according to claim 1, wherein the open surface area of the mesh structure is configured to cover at least 60% of a total area of the mesh structure.

17. The layered protective structure according to claim 1, wherein diameters of the first layer holes are wholly arranged inside the mesh structure and vary between 2 and 7 cm in size.

18. The layered protective structure according to claim 1, wherein the second layer comprises sensors and connectors to external devices.

19. The layered protective structure according to claim 1, wherein the second layer comprises at least one second layer hole and at least some of the second layer threads are arranged to form at least one circle around the second layer hole.

20. The layered protective structure according to claim 1, wherein the third layer comprises at least one of foam plastic or at least partly foam plastic.

* * * * *